United States Patent
Liu et al.

(10) Patent No.: US 10,908,454 B2
(45) Date of Patent: Feb. 2, 2021

(54) BACKLIGHT MODULE AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Yaoyang Liu, Shanghai (CN); Lei Niu, Shanghai (CN); Jialing Li, Shanghai (CN); Yuan Ding, Shanghai (CN); Jun Ma, Xiamen (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 180 days.

(21) Appl. No.: 15/628,490

(22) Filed: Jun. 20, 2017

(65) Prior Publication Data
US 2018/0188602 A1    Jul. 5, 2018

(30) Foreign Application Priority Data
Dec. 29, 2016    (CN) .......................... 2016 1 1242826

(51) Int. Cl.
*G02B 27/22*    (2018.01)
*G02F 1/13357*    (2006.01)
(Continued)

(52) U.S. Cl.
CPC ...... *G02F 1/133602* (2013.01); *G02B 6/0011* (2013.01); *G02B 30/00* (2020.01);
(Continued)

(58) Field of Classification Search
CPC ...... G02B 6/0011; G02B 6/0013–0018; G02B 6/0023–0038; G02B 6/005–0055;
(Continued)

(56) References Cited

U.S. PATENT DOCUMENTS 7,253,799 B2 *    8/2007    Lee ...................... G02B 6/0036
                                                        345/102
2013/0329301 A1 *  12/2013   Travis .................... G02B 13/06
                                                          359/630

(Continued)

FOREIGN PATENT DOCUMENTS

CN    101922649 A    12/2010
CN    105 137 598 A  12/2015

*Primary Examiner* — Stephone B Allen
*Assistant Examiner* — Jyotsna V Dabbi
(74) *Attorney, Agent, or Firm* — Alston & Bird LLP (57) ABSTRACT

A backlight module and a display device include a light guide plate and a point light source. The light guide plate includes a first part and a second part. The first part includes a first light incidence surface and a first light-emitting surface intersecting with the first light incidence surface. The second part includes a second light incidence surface and a second light-emitting surface intersecting with the second light incidence surface. The first light incidence surface intersects with the second light-emitting surface, the first light-emitting surface and the second light incidence surface are arranged oppositely, and both the first light-emitting surface and the second light-emitting surface include grating structures.

19 Claims, 8 Drawing Sheets

(51) Int. Cl.
*F21V 8/00* (2006.01)
*G03H 1/22* (2006.01)
*G02B 30/00* (2020.01)
*G02B 5/02* (2006.01)

(52) U.S. Cl.
CPC .............. *G03H 1/22* (2013.01); *G03H 1/2286* (2013.01); *G02B 5/021* (2013.01); *G03H 2223/16* (2013.01)

(58) Field of Classification Search
CPC ......... G02B 6/0075–0078; G02B 5/021–0231; G02B 27/22; G03H 1/22; G03H 1/2286; G03H 2223/16; G02F 1/133602; G02F 1/133606; G02F 2001/133607
USPC ........................................................ 359/462
See application file for complete search history.

(56) References Cited

U.S. PATENT DOCUMENTS

| | | | |
|---|---|---|---|
| 2015/0177438 A1 | 6/2015 | Drolet et al. | |
| 2016/0147000 A1* | 5/2016 | Yoon ...................... | G02B 6/005 362/606 |
| 2016/0161662 A1* | 6/2016 | Jung ................... | G02B 6/0026 362/606 |
| 2016/0327705 A1* | 11/2016 | Simmonds ......... | G02B 27/0081 |

\* cited by examiner

BACKLIGHT MODULE AND DISPLAY DEVICE

CROSS-REFERENCES TO RELATED APPLICATIONS

This application claims priority to a Chinese patent application No. CN201611242826.4, filed on Dec. 29, 2016, and entitled "Backlight Module and Display Device", the disclosure of which is incorporated herein by reference in entirety.

TECHNICAL FIELD

The present application relates to display backlight module fabrication technologies, and more particularly, to a backlight module and a display device.

BACKGROUND

Holographic three-dimensional display can realize true three-dimensional display because of complete reproduction of depth information of a scene, thus is considered an optimal scheme of realizing three-dimensional display. At the present time, most of the systems capable of realizing dynamic holographic three-dimensional display rely on spatial light modulators to load information of incident light fields in order to realize any three-dimensional reproduction of required display scenes.

A coherent light source is required for the spatial light modulators in a holographic three-dimensional display to load information, which is different from a light source for a traditional two-dimensional display system. However, emergent light from a backlight module in the traditional two-dimensional display system is non-coherent, thus it cannot be utilized by the spatial light modulator in a holographic display. In addition, the vast majority of existing coherent light sources are generated by lasers, which have very small emitting areas generally, thus are not suitable for locations where large-area light sources are needed so are not suitable for holographic three-dimensional display having high requirements for light-emitting areas as well.

SUMMARY

The present disclosure provides a backlight module and a display device to achieve an objective of providing the backlight module appropriate for holographic three-dimensional display.

In one aspect, an embodiment of the present disclosure provides a backlight module, which includes: a light guide plate and a point light source.

The light guide plate includes a first part and a second part. The first part includes a first light incidence surface and a first light-emitting surface intersecting with the first light incidence surface. The second part includes a second light incidence surface and a second light-emitting surface intersecting with the second light incidence surface. The first light incidence surface intersects with the second light-emitting surface, the first light-emitting surface and the second light incidence surface are arranged oppositely, and both the first light-emitting surface and the second light-emitting surface are set as grating structures.

The point light source is arranged at the first light incidence surface of the light guide plate, so that a light ray emitted from the point light source enters, at a first preset angle, into the first part and undergoes multiple total reflections in the first part. Reflected light enters into the second part through the first light-emitting surface and the second light incidence surface, undergoes multiple total reflections in the second part and finally emits from the second light-emitting surface.

In another aspect, an embodiment of the present disclosure further provides a display device, which includes a backlight modules provided by any of the embodiments of the present disclosure.

DETAILED DESCRIPTION OF THE EMBODIMENTS

The present disclosure is further described in detail in the following with reference to the accompanying drawings and embodiments. It is to be understood that the embodiments set forth herein are merely intended to interpret the present disclosure and are not intended to limit the present disclosure. In addition, it is also to be noted that for ease of description, drawings merely show parts related to the present disclosure instead of all parts.

Figure 1A:
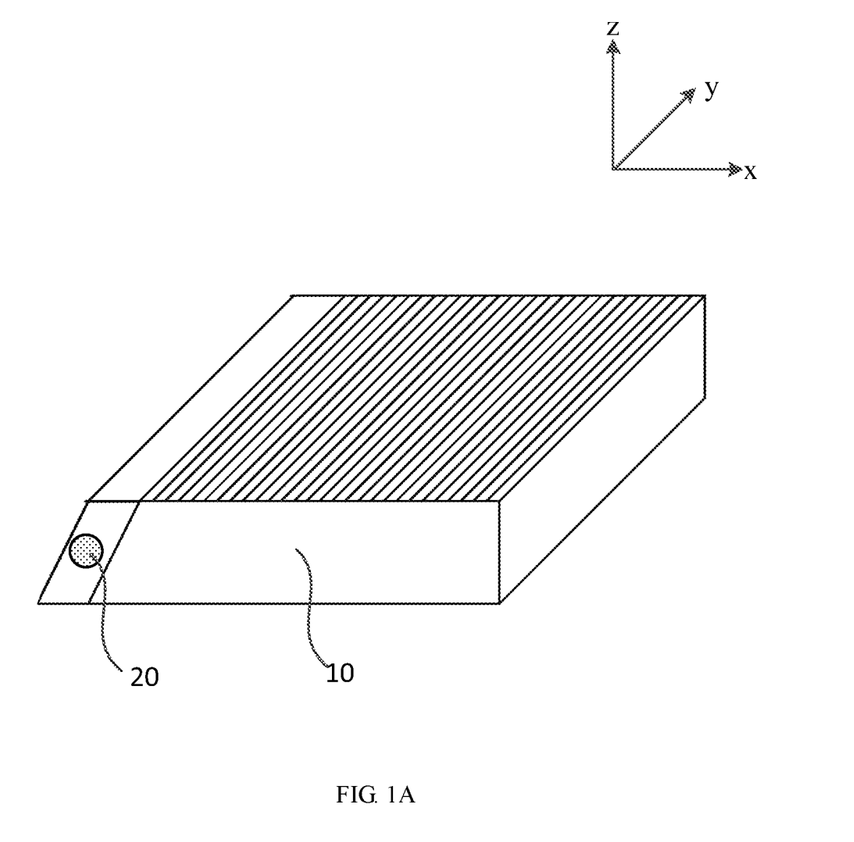
FIG. 1A is a schematic structural diagram of a backlight module according to an embodiment of the present disclosure.
Figure 1B:
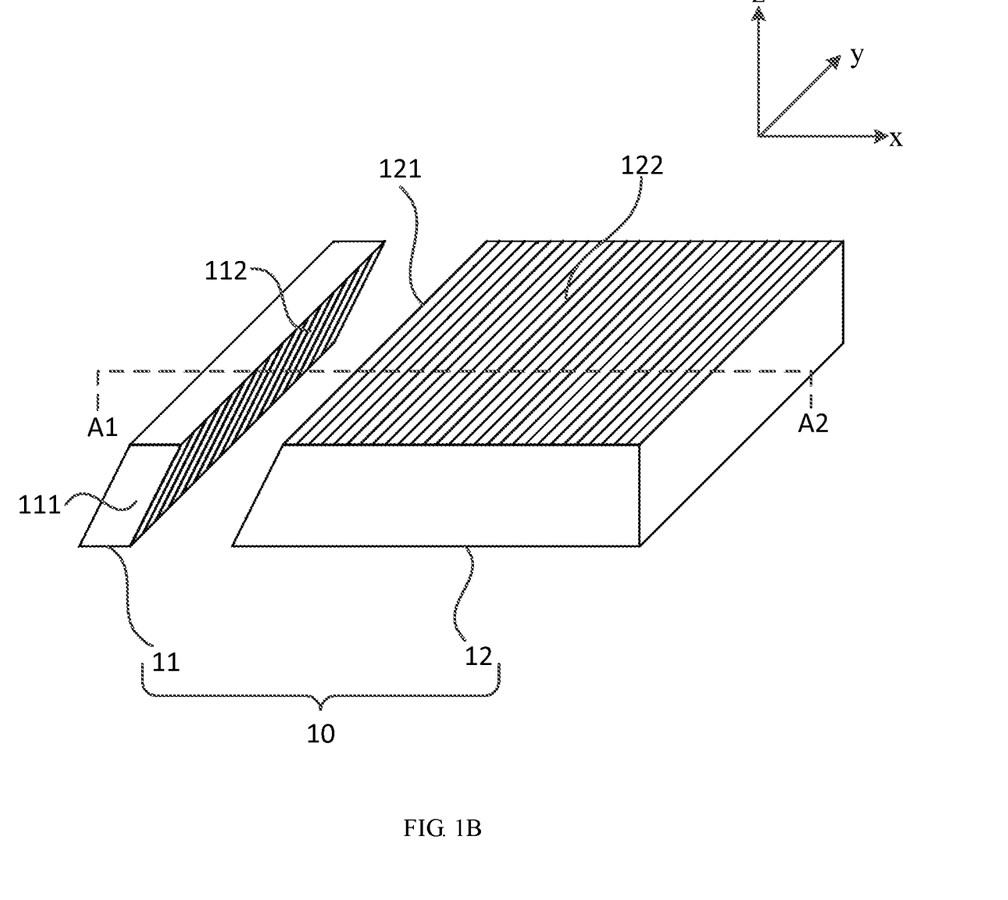
FIG. 1B is an exploded view of the backlight module in FIG. 1A.
Figure 1C:
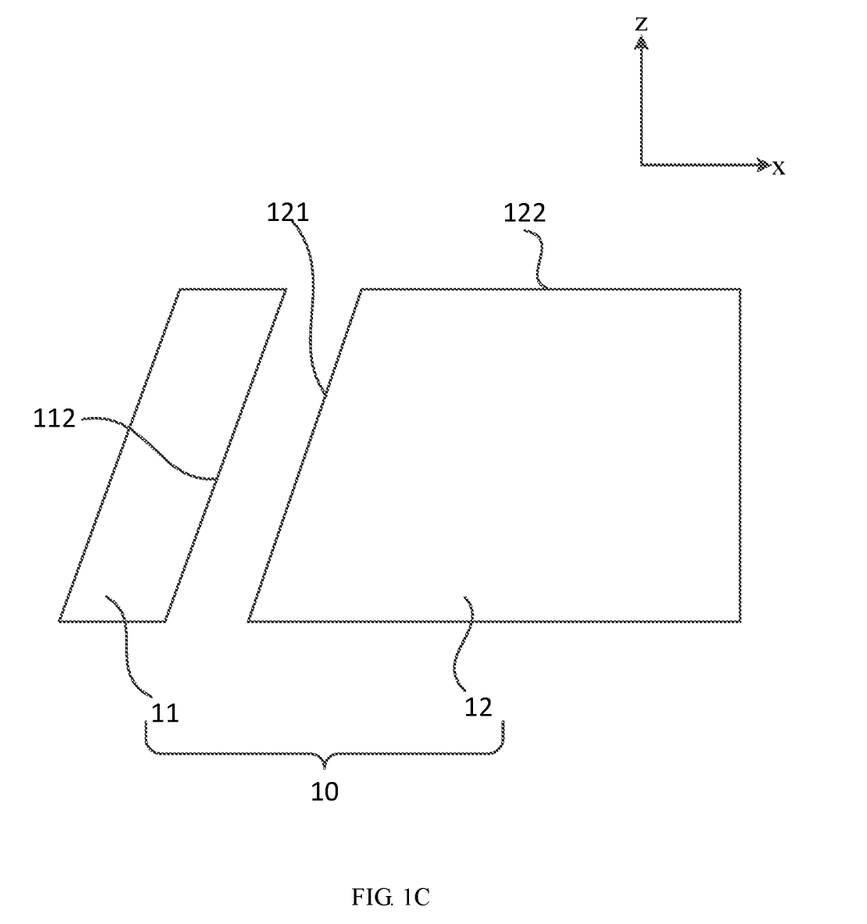
FIG. 1C is a schematic cross sectional view along A1-A2 in FIG. 1B.
Figure 1D:
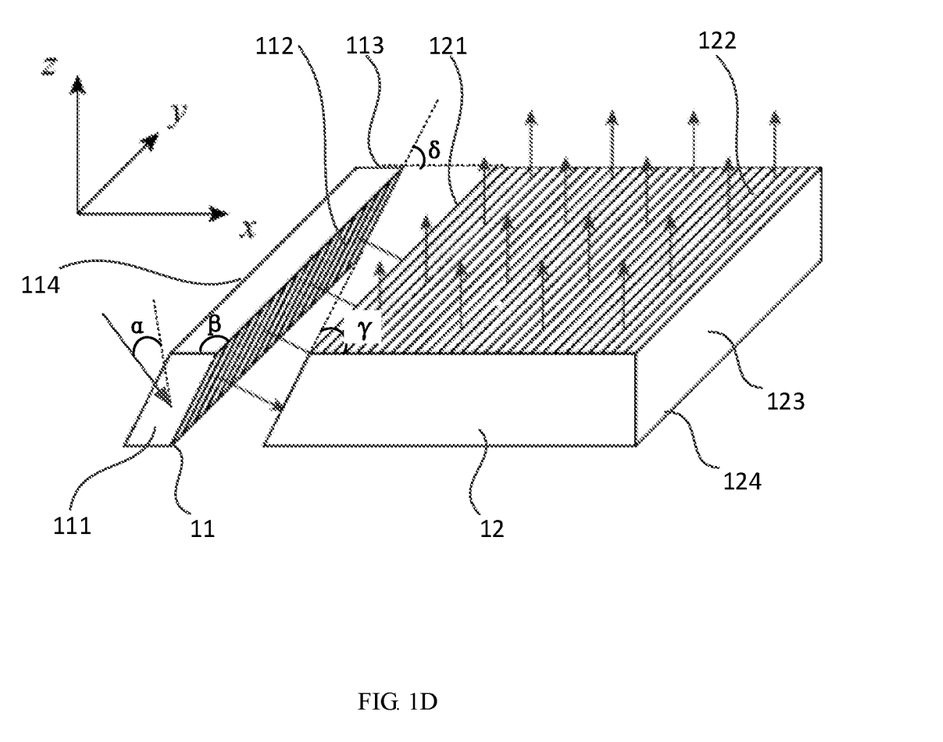
FIG. 1D is a schematic diagram of light rays path propagating out from the backlight module in FIG. 1A.

FIG. 1A is a schematic structural diagram of a backlight module according to an embodiment of the present disclosure; FIG. 1B is an exploded view of the backlight module in FIG. 1A; FIG. 1C is a schematic sectional view along A1-A2 in FIG. 1B; and FIG. 1D is a schematic diagram of a total propagation path of light rays propagating in the backlight module in FIG. 1A. Referring to FIG. 1A-FIG. 1D, the backlight module includes a light guide plate 10 and a point light source 20. The light guide plate 10 includes a first part 11 and a second part 12. The first part 11 includes a first light incidence surface 111 and a first light-emitting surface 112 intersecting with the first light incidence surface 111. The second part 12 includes a second light incidence surface 121 and a second light-emitting surface 122 intersecting with the second light incidence surface 121. The first light incidence surface 111 intersects with the second light-emitting surface 122, the first light-emitting surface 112 and the second light incidence surface 121 are arranged oppositely, and both the first light-emitting surface 112 and the second light-emitting surface 122 are set as grating structures. The point light source 20 is arranged at the first light incidence surface 111 of the light guide plate 10, so that a light ray emitted from the point light source 20 enters, at a first preset angle, into the first part 11 and undergoes multiple total reflections in the first part 11, reflected light enters into the second part 12 through the first light-emitting surface 112 and the second light incidence surface 121, undergoes multiple total reflections in the second part 12 and finally emits from the second light-emitting surface 122. Both the first part 11 and the second part 12 are transparent materials.

Persons skilled in the art may understand that the technical solution of the embodiment of the present disclosure in essence resides in that a light beam emitted from the point light source is expanded utilizing grating to form an area light source, which may not change frequency of light.

In addition, for the light guide plate with a determined structure, thicknesses of the first part 11 and the second part 12 are determined, light rays emitted from different positions of the second light-emitting surface 122 have a determined optical path difference (the optical path difference is related to the thicknesses of the first part 11 and the second part 12), that is, a determined phase difference is formed.

Persons skilled in the art may understand that the light ray may be decomposed into p polarization and s polarization, wherein the p polarization refers to light component parallel to the plane of incidence, and the s polarization refers to light component perpendicular to the plane of incidence. When a beam of light is refracted (or reflected) on an interface of two different materials, reflective and refractive indexes of the interfacing materials may be different for p polarization and s polarization if the media materials are birefringent. In the embodiment of the present disclosure, total internal reflection from an incident angle, larger than the critical angle (from the Snell's law), in the first part 11 and the second part 12 of the guide plate. Even though, in the refractive processes of the light ray at the interfaces of the first light incidence surface 111, the first light-emitting surface 112, the second light incidence 121 and the second light-emitting surface 122, the polarization states of the light ray may change if the light guide material is birefringent, the polarization state of the exit light rays from the second light-emitting surface 122 remains the same as the input light at the first incident surface of the first part 11.

In summary, the light rays emitted from the backlight module provided by the embodiment of the present disclosure have the same wavelength, constant phase difference and identical polarization state, therefore are coherent.

In the embodiment of the present disclosure, by setting a light guide plate having a particular structure, light emitted from a point light source in the backlight module may form large-area coherent light after undergoing a series of refraction, total reflection and diffraction. In this way, the problem that light emitted from the existing backlight module is not fit for holographic three-dimensional display is solved, and the objective of providing a backlight module fit for holographic three-dimensional display is implemented.

When in a specific setting, to allow light rays emitted from the first light-emitting surface 112 to enter into the second part 12 from the second light incidence surface 121 as much as possible, optionally, as shown in FIG. 1A, the first light-emitting surface 112 seamlessly fits to the second light incidence surface 121. In this way, a phenomenon that additional emergent and incident light rays occur when passing through an intermediate layer of air may be reduced, a utilization rate of the light rays emitted from the point light source 20 may be improved, and a performance of the backlight module may be enhanced. On this basis, optionally, the refractive index of the first part 11 is greater than that of the second part 12. An advantage of this setting is that the light rays entering into the first part 11 are ensured to be merely emitted from slots of the grating structure of the first light-emitting surface 112.

When in fabrication, optionally, the first light-emitting surface 112 and the second light-emitting surface 122 are set as grating structures by using slotting, imprinting, holographic or bonding periodic metal patch processes, which may contribute to reducing fabrication cost of the grating structure. Referring to FIG. 1D, the grating structure includes a plurality of slots arranged in order.

Referring to FIG. 1D, the first preset angle $\alpha$ refers to an included angle between a light ray emitted from the point light source 20 and the first light incidence surface 111 of the first part 11 in the process of the light ray emitted from the point light source 20 shooting onto the first part 11. When in design, the first preset angle $\alpha$ may be an arbitrary value, which is not limited in the present disclosure.

Referring to FIG. 1D, there is a second preset angle $\delta$ between the first light-emitting surface 112 and second light-emitting surface 122. An objective of this setting is to allow the light rays emitted from the second part 12 to be emitted along a direction perpendicular to the second light-emitting surface 122. When the first light-emitting surface 112 seamlessly fits to the second light incidence surface 121, the second preset angle $\delta$ is equal to an included angle $\gamma$ between the second light incidence surface 121 and the second light-emitting surface 122. When in specific design, the second preset angle $\delta$ may be an arbitrary value, which is not limited in the present disclosure.

Continuing referring to FIG. 1D, persons skilled in the art may understand that the first preset angle $\alpha$, an included angle $\beta$ between the first light incidence surface 111 and the first light-emitting surface 112 of the first part 11, the included angle $\gamma$ between the second light incidence surface 121 and the second light-emitting surface 122, the refractive index of the first part 11, the refractive index of the second part 12, a grating constant of the grating structure of the first light surface 112 of the first part 11, the extending direction of the slots constituting the grating, a grating constant of the grating structure of the second light-emitting surface 122 of the second part 12 and the extending direction of the slots constituting the grating and the like jointly determine the included angle between the light ray finally emitted from the second light-emitting surface 122 of the second part 12 and the second light-emitting surface 122 (namely the propagation direction of the light ray emitted from the second light-emitting surface 122). The grating constant includes a width of the slots constituting the grating and a distance between two adjacent slots.

When in design, to ensure that light rays entering into the first part 11 can undergo a total reflection on the rest surfaces except the second light incidence surface 111 and the second light-emitting surface 112, optionally, all surfaces in the first part 11 are reflecting surfaces except for the first light incidence surface 111 and the first light-emitting surface 112. Exemplarily, referring to FIG. 1D, the first part 11 is columnar, a cross section thereof is a parallelogram, the first light incidence surface 111 is a bottom surface of the first part 11, and the first light-emitting surface 112 is a side surface of the first part 11. Optionally, in the first part 11, another bottom surface 113 opposite to the first light incidence surface 111, a side surface 114 opposite to the first light-emitting surface 112 and two side surfaces in parallel with a plane surface defined by an x axis and a y axis are set as reflecting surfaces. Further, when in the first part 11, light rays merely propagate within the plane surface defined by the x axis and the y axis, it is allowable that in the first part 11, the another bottom surface 113 opposite to the first light incidence surface 111 and the side surface 114 opposite to the first light-emitting surface 112 are set as reflecting surfaces.

Similarly, when in design, to ensure that light rays entering into the second part 12 can undergo total reflection on other surfaces except the second light incidence surface 121 and the second light-emitting surface 122, optionally, all surfaces of the second part 12 are reflecting surfaces except for the second light incidence surface 121 and the second light-emitting surface 122. Exemplarily, as shown in FIG. 1d, the second part 12 is columnar, a cross section thereof is a right-angled trapezoid, the second light incidence surface 121 is a side surface of the second part 12, the second light-emitting surface 122 is another side surface of the second part 12. In the second part 12, a side surface 123 opposite to the second light incidence surface 121, a side surface 124 opposite to the second light-emitting surface 122 and two bottom surfaces in parallel with the plane surface defined by the x axis and the y axis are set as reflecting surfaces. Further, when in the second part 12, light rays merely propagate within the plane surface defined by the x axis and the y axis, optionally, in the second part 12, the another bottom surface 123 opposite to the second light incidence surface 121 and the side surface 124 opposite to the second light-emitting surface an optical path 122 are set as reflecting surfaces.

Figure 2:
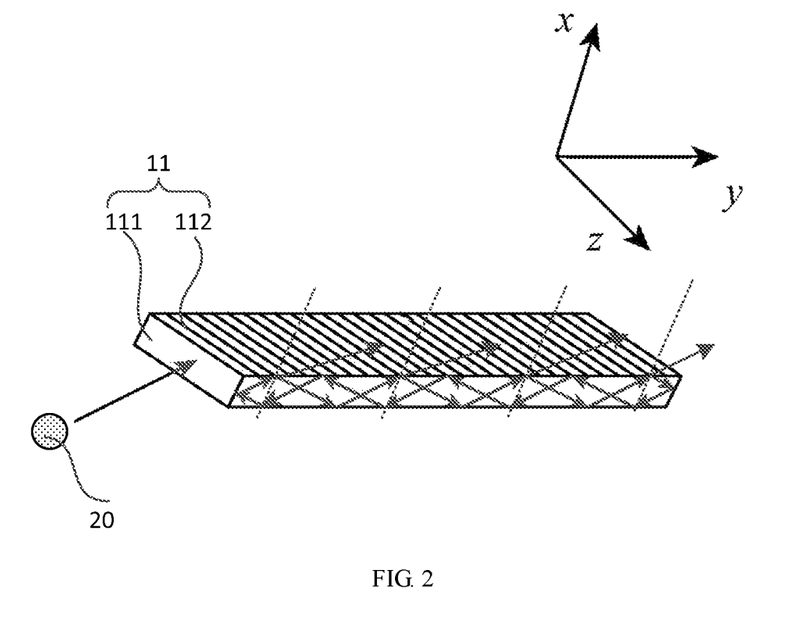
FIG. 2 is a diagram of light rays propagating in and out of the first part of the light guide.

FIG. 2 is a diagram of light rays propagating in the first part 11. Referring to FIG. 2, a light ray emitted from the point light source 20 enters, at a first preset angle larger than the internal total reflection critical angle at the interface, into the first part 11 and undergoes multiple total reflections in the first part 11, and reflected light shoots from the first light-emitting surface 112. In other words, the grating on the first light-emitting surface 112 converts the point light source into a line light source having a narrow width.

Figure 3:
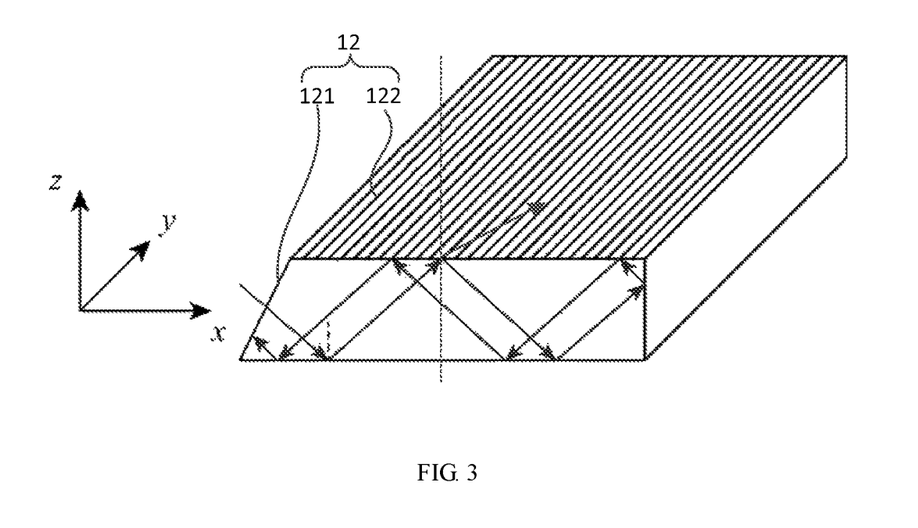
FIG. 3 is a diagram of light rays propagating in and out of the second part the light guide.

FIG. 3 is a diagram of light rays propagating in the second part. Referring to FIG. 3, a light ray emitted from the first light-emitting surface is incident on the second light incidence surface 121, then enters into the second part 12, undergoes multiple total reflections in the second part 12, and finally is emitted from the second light-emitting surface 122. In other words, the grating on the second light-emitting surface 122 converts the line light source into an area light source.

Figure 4A:
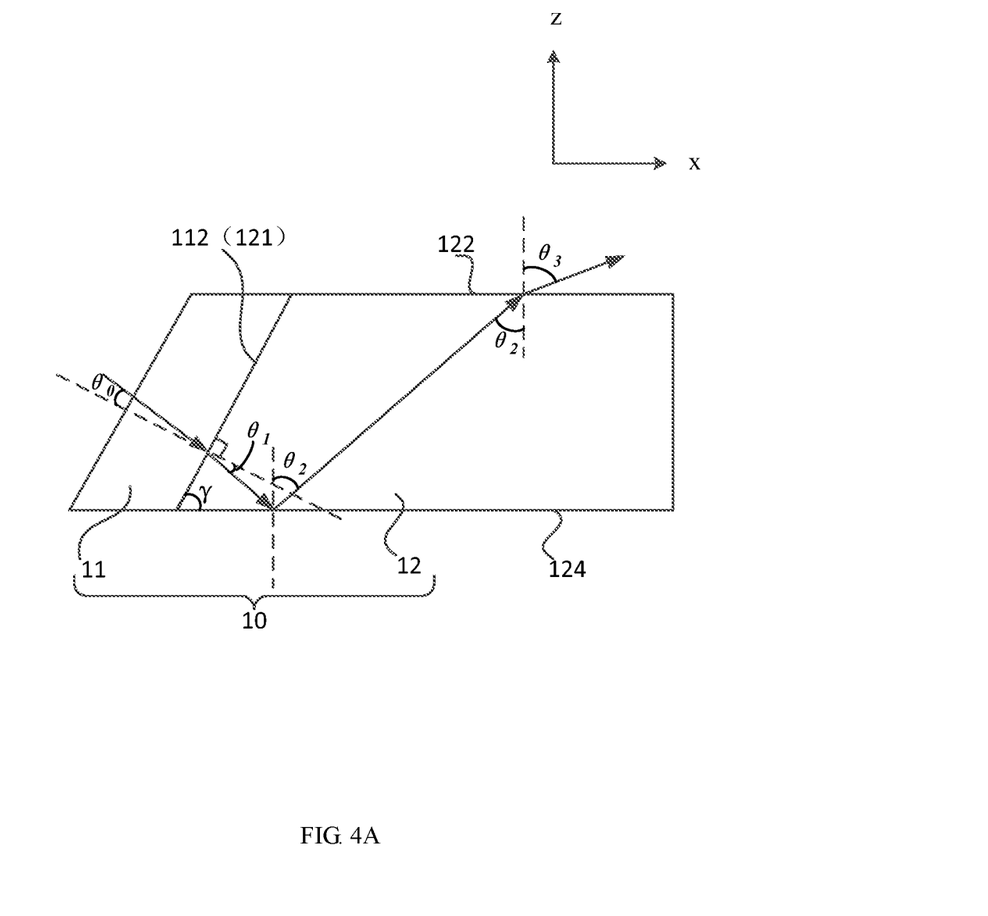
FIG. 4A and FIG. 4B are diagrams of equivalent light rays propagating in the light guide plate.
Figure 4B:
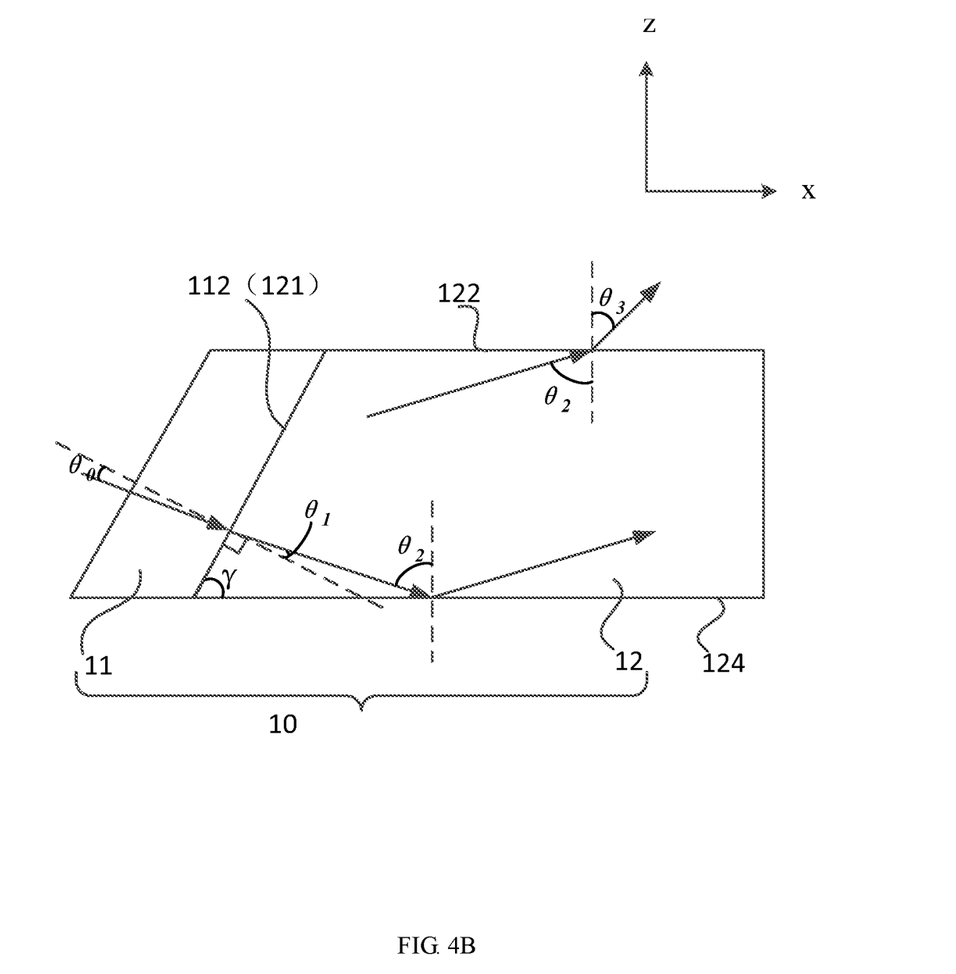

FIG. 4a and FIG. 4b are schematic diagrams of two possible propagation paths of light rays propagating in the light guide plate. FIG. 4a and FIG. 4b omit the process that the light ray undergoes multiple total reflections in the first part 11 and the second part 12. Referring to FIG. 4a and FIG. 4b, an included angle between a projection, on a plane defined by the x axis and the z axis, of the light ray emitted from the point light source and a normal line of the first light-emitting surface 112 of the first part 11 is $\theta_0$. The light ray is emitted from the first light-emitting surface 112 of the first part 11. An included angle between the light ray emitted from the first light-emitting surface 112 and the normal line of the first light-emitting surface 112 is $\theta_1$. Obviously, $\theta_0$ and $\theta_1$ satisfies a three-dimensional space grating equation. The light ray enters into the second part 12 from the second light incidence surface 121 and undergoes a total reflection on a side surface 124 opposite to the second light-emitting surface 122. In the process of the total reflection, an included angle between the light ray and the normal line of the side surface 124 opposite to the second light-emitting surface 122 is $\theta_2$. Referring to FIG. 4a, as can be known from a geometrical relationship that:

$$\theta_1 + \frac{\pi}{2} = \gamma + \left(\frac{\pi}{2} - \theta_2\right),$$

and then $\theta_2 = \gamma - \theta_1$ is obtained. Alternatively, referring to FIG. 4b, as can be known from a geometrical relationship that:

$$\frac{\pi}{2} - \theta_1 = \gamma + \left(\frac{\pi}{2} - \theta_2\right),$$

and then $\theta_2 = \gamma + \theta_1$ is obtained. That is, $\theta_2 = \gamma \pm \theta_1$. The light ray undergoing total reflection is finally emitted from the second light-emitting surface 122 of the second part 12. An included angle between the light ray emitted from the second light-emitting surface 122 and the normal line of the second light-emitting surface 122 is $\theta_3$. Obviously, $\theta_2$ and $\theta_3$ satisfy a three-dimensional space grating equation.

In summary, for any light guide plate with a determined structure, the included angle $\theta_3$ between the light ray emitted from the second light-emitting surface 122 and the normal line of the second light-emitting surface 122 is determined by the included angle $\theta_0$ between a projection, on a plane defined by the x axis and the z axis, of the light ray emitted from the point light source and a normal line of the first light-emitting surface 112 of the first part 11, and a magnitude of the $\theta_0$ is determined by the included angle (namely the first preset angle α) between the light ray emitted from the point light source and the first incidence surface 111. In other words, for any light guide plate with a determined structure, the propagation direction of the light ray emitted from the second light-emitting surface 122 is determined by the propagation direction of the light ray incident from the first incidence surface 111. When in practical design, to make a backlight source have a better luminous effect, the particular first preset angle α may be selected so that the light ray can be emitted along a direction perpendicular to the second light-emitting surface 122.

When considering a fabrication, the light ray emitted from the point light source being set to be incident on the first light incidence surface 111 of the first part 11 along the direction perpendicular to the first light incidence surface 111 may be more easily implemented than the light ray being incident on the first light incidence surface 111 of the first part 11 along other directions. When the light ray emitted from the point light source is incident along the direction perpendicular to the first light incidence surface 111, the light ray has a minimum full reflection efficiency and a maximum incidence efficiency at the first light incidence surface 111. Optionally, the first light incidence surface 111 of the first part 11 is cut so that the first light incidence surface 111 intersects with the plane defined by the x axis and the z axis to allow the light ray emitted from the point light source to be incident along the direction perpendicular to the first light incidence surface 111.

Figure 5:
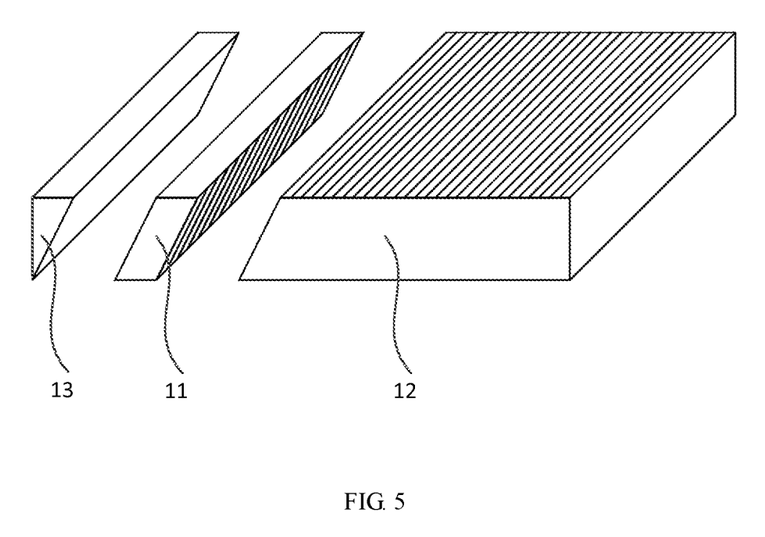
FIG. 5 is a schematic structural diagram of another light guide plate according to an embodiment of the present disclosure.

FIG. 5 is a schematic structural diagram of another light guide plate according to an embodiment of the present disclosure. Referring to FIG. 5, compared with the foregoing technical solution, the light guide plate further includes a third part 13. Specifically, the third part 13 is positioned at one side, away from the second part 12, of the first part 11.

The first part 11, the second part 12 and the third part 13 are pieced together to form a cuboid structure. The advantage of this setting resides in that after the light guide plate 20 is mounted on the backlight module, the third part 13 may play a supporting role to ensure that the light guide plate is firmly and stably fixed to the backlight module.

Further, when considering that the light ray is transmitted from an optically denser medium to an optically thinner medium, a total reflection may occur in the light ray when an incidence angle of the light ray is greater than a critical angle of the total reflection. Optionally, the refractive index of the first part 11 is greater than that of the third part 13, so that a total reflection may occur in the light ray on an interface between the first part 11 and the third part 13 by adjusting a direction of the light ray incident on the first light incidence surface 111. In such a way, an effect of a total reflection of the light ray may occur on the side surface opposite to the first light-emitting surface 112 of the first part 11 without setting a side surface (namely the side surface opposite to the first light-emitting surface 112), in contact with the third part 13, in the first part 11 as a reflecting surface. In this way, a fabricating process of the light guide plate may be reduced, and a fabrication technology of the light guide plate may be simplified. Typically, the refractive index of the second part 12 is equal to that of the third part 13, so that when in a specific fabrication, the same material (such as glass) may be utilized to fabricate the second part 12 and the third part 13, thereby reducing the complexity from multiple materials for fabricating the light guide plate.

On the basis of the foregoing technical solution, optionally, the point light source 20 may be an optical fiber laser light source, a laser diode or a light-emitting diode having better degree of coherence. A reason for such a setting is as below: light emitted by the optical fiber laser light source, the laser diode or the light-emitting diode having better degree of coherence has better coherence, which is advantageous to further improving the performance of the backlight module.

Figure 6:
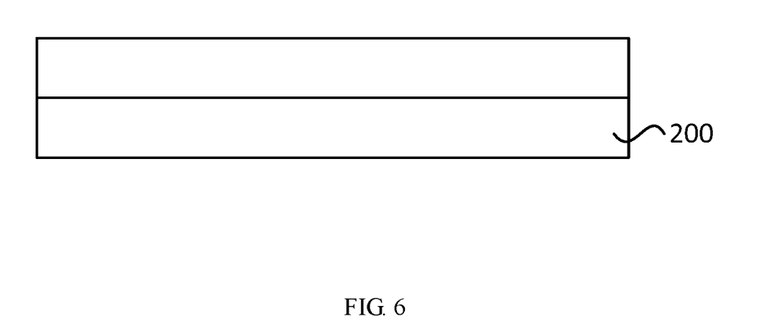
FIG. 6 is a schematic structural diagram of a display device according to an embodiment of the present disclosure.

Based on the same inventive concept, an embodiment of the present disclosure further provides a display device. FIG. 6 is a schematic structural diagram of a display device according to an embodiment of the present disclosure. Referring to FIG. 6, the display device includes any backlight module 200 provided by the foregoing embodiments, wherein the backlight module 200 is configured to provide backlight for the display device. It is to be noted that, the display device provided by the embodiments of the present disclosure may further include other electric circuits and devices for supporting proper operation of the display device. The display device may be one of a mobile phone, a tablet computer, an electronic paper and an electronic photo frame.

In the display device provided by the embodiment of the present disclosure, by setting a light guide plate having a particular structure, light emitted from a point light source in the backlight module may be caused to form large-area coherent light after undergoing a series of refraction, total reflection and diffraction. In this way, the problem that light emitted from the existing backlight module is not fit for holographic three-dimensional display is solved, and the objective of providing a backlight module fit for holographic three-dimensional display is implemented.

It is noted that the foregoing embodiments are merely preferred embodiments of the present disclosure and technical principles used thereby. Persons skilled in the art may understand that the present disclosure is not limited to the specific embodiments described herein, and persons skilled in the art may make various obvious changes, readjustments and substitutions without departing from the scope of protection of the present disclosure. Therefore, although reference is made to the present disclosure in more detail in the foregoing embodiments, the present disclosure is not merely limited to the foregoing embodiments, other more equivalent embodiments may be further included without departing from the conception of the present disclosure, and the scope of the present disclosure depends on the scope of the appended claims.

What is claimed is:

1. A backlight module, comprising:
a light guide plate and a point light source;
wherein the light guide plate comprises:
a first part comprising a first light incidence surface and a first light-emitting surface intersecting with the first light incidence surface; and
a second part comprising a second light incidence surface and a second light-emitting surface intersecting with the second light incidence surface;
wherein a plane where the first light incidence surface is located intersects with a plane where the second light-emitting surface is located, wherein the first light-emitting surface and the second light incidence surface are arranged opposite to each other, wherein both the first light-emitting surface and the second light-emitting surface comprise grating structures;
wherein the point light source is arranged at the first light incidence surface of the light guide plate, wherein a light ray emitted by the point light source enters at a first preset angle into the first part, undergoes multiple total reflections in the first part, exits the first light-emitting surface, enters the second light incidence surface, undergoes multiple total reflections in the second part and finally emits from the second light-emitting surface;
wherein an included angle between the first light-emitting surface and the second light-emitting surface is less than 90 degrees and greater than 0 degree;
wherein the first part further comprises a side surface intersecting with the first light incidence surface and the first light-emitting surface, wherein the side surface and the second light-emitting surface are in the same plane;
wherein the second part emits a light ray along a direction perpendicular to the second light-emitting surface; and
wherein the light ray emitted from the second light-emitting surface has a same polarization state as the light ray incident at the first light incidence surface of the first part.

2. The backlight module according to claim 1, wherein the first light-emitting surface seamlessly fits to the second light incidence surface.

3. The backlight module according to claim 1, wherein the grating structures of the first light-emitting surface and the second light-emitting surface are fabricated by slotting, imprinting, holographic or bonding periodic metal patch processes.

4. The backlight module according to claim 1, wherein there is a second preset angle between the first light-emitting surface and the second light-emitting surface.

5. The backlight module according to claim 1, wherein all surfaces in the first part are reflecting surfaces except for the first light incidence surface and the first light-emitting surface.

6. The backlight module according to claim 5, wherein the first part is a column having a parallelogram cross section, wherein the first light incidence surface is a bottom surface of the first part, and wherein the first light-emitting surface is a side surface of the first part.

7. The backlight module according to claim 1, wherein all surfaces in the second part are reflecting surfaces except for the second light incidence surface and the second light-emitting surface.

8. The backlight module according to claim 7, wherein the second part is a column having a cross section of a right-angled trapezoid, and wherein the second light incidence surface is one side surface of the second part, and the second light-emitting surface is another side surface of the second part.

9. The backlight module according to claim 1, wherein the light guide plate further comprises a third part, positioned at a side of the first part opposite to the second part, and wherein the first part, the second part and the third part are pieced together to form a cuboid structure.

10. The backlight module according to claim 9, wherein a refractive index of the first part is greater than that of the third part.

11. The backlight module according to claim 10, wherein a refractive index of the second part is equal to that of the third part.

12. The backlight module according to claim 1, wherein the point light source comprises an optical fiber laser light source, a laser diode, or a light-emitting diode having high degree of coherence.

13. A display device, comprising a backlight module, wherein the backlight module comprises a light guide plate and a point light source,
wherein the light guide plate comprises:
a first part comprising a first light incidence surface and a first light-emitting surface intersecting with the first light incidence surface; and
a second part comprising a second light incidence surface and a second light-emitting surface intersecting with the second light incidence surface;
wherein a plane where the first light incidence surface is located intersects with a plane where the second light-emitting surface is located, wherein the first light-emitting surface and the second light incidence surface are arranged opposite to each other, wherein both the first light-emitting surface and the second light-emitting surface comprise grating structures;
wherein the point light source is arranged at the first light incidence surface of the light guide plate, wherein a light ray emitted by the point light source enters at a first preset angle into the first part, undergoes multiple total reflections in the first part, exits the first light-emitting surface, enters the second light incidence surface, undergoes multiple total reflections in the second part and finally emits from the second light-emitting surface;
wherein an included angle between the first light-emitting surface and the second light-emitting surface is less than 90 degrees and greater than 0 degree;
wherein the first part further comprises a side surface intersecting with the first light incidence surface and the first light-emitting surface, wherein the side surface and the second light-emitting surface are in the same plane;
wherein the second part emits a light ray along a direction perpendicular to the second light-emitting surface; and
wherein the light ray emitted from the second light-emitting surface has a same polarization state as the light ray incident at the first light incidence surface of the first part.

14. The display device according to claim 13, wherein the first light-emitting surface seamlessly fits to the second light incidence surface.

15. The display device according to claim 13, wherein a refractive index of the first part is greater than that of the second part.

16. The display device according to claim 13, wherein the first light-emitting surface and the second light-emitting surface comprise grating structures made from slotting, imprinting, holographic or bonding periodic metal patch processes.

17. The display device according to claim 13, wherein there is a second preset angle between the first light-emitting surface and the second light-emitting surface.

18. The display device according to claim 13, wherein all surfaces in the first part are reflecting surfaces except for the first light incidence surface and the first light-emitting surface.

19. The display device according to claim 18, wherein the first part is a column having a cross section of a parallelogram, the first light incidence surface is a bottom surface of the first part, and the first light-emitting surface is a side surface of the first part.

* * * * *